United States Patent [19]
Nisley

[11] Patent Number: 5,259,628
[45] Date of Patent: Nov. 9, 1993

[54] SEAL ASSEMBLY

[75] Inventor: Donald L. Nisley, Greenville, S.C.

[73] Assignee: Reliance Electric Industrial Company, Greenville, S.C.

[21] Appl. No.: 919,162

[22] Filed: Jul. 23, 1992

[51] Int. Cl.$^5$ .............................................. F16C 33/78
[52] U.S. Cl. .......................................... 277/9; 277/56; 277/95; 384/480; 384/482
[58] Field of Search ....................... 277/9, 95, 96.2, 96, 277/56; 384/480, 144, 482, 140

[56] References Cited

U.S. PATENT DOCUMENTS

| | | | |
|---|---|---|---|
| 4,348,067 | 9/1982 | Tooley | 384/480 |
| 4,832,511 | 5/1989 | Nisley et al. | 384/480 |
| 4,943,068 | 7/1990 | Hatch et al. | 277/56 |
| 5,172,917 | 12/1992 | DuGay | 277/95 |

*Primary Examiner*—Lenard A. Footland
*Attorney, Agent, or Firm*—Dority & Manning

[57] ABSTRACT

A seal assembly for a bearing housing with an opening therein for receiving a shaft in which a sleeve having an axial bore for receiving the shaft is disposed within the housing opening. The sleeve has a plurality of outwardly extending annular ribs engaging annular grooves on the inner circumference of the housing opening to provide a labyrinth seal section. The sleeve also supports a V-ring seal disposed externally of the labyrinth section which has a sealing lip which extends outwardly at an angle from the sleeve of less than 90° towards the side of one of the ribs on the housing. Disposed between the sealing lip and the rib of the housing opening is a disc washer which has an inner diameter which is greater than the outer diameter of the sleeve but less than the outer diameter of the V-ring lip portion, which cooperates with the sealing lip portion of the V-ring seal to provide a sealing contact with the washer. This portion of the disc washer is composed of a metallic material such as steel. Disposed about the outer circumference of the disc washer is a compressible rubber material which is compressed into an annular groove which extends about the inner circumference of the opening in the bearing housing.

4 Claims, 4 Drawing Sheets

SEAL ASSEMBLY

BACKGROUND OF THE INVENTION

The present invention relates to a seal assembly for sealing the shaft in an opening in a stationary housing. More particularly, the invention relates to a seal assembly which provides a grease seal which permits effective purging during the operation and lubrication of the bearings while minimizing the ingress of moisture and foreign particulate matter which would cause excessive wear on the operating parts of the bearing and shaft.

One prior art bearing seal is disclosed in U.S. Pat. No. 4,348,067, the disclosure of which is hereby incorporated in full by reference. The '067 patent discloses a sealing structure for a bearing shaft which consists of the combination of an inner labyrinth seal, an outer V-ring seal, and a sleeve which fits snugly on the shaft and forms a part of the labyrinth seal and supports the V-ring seal. When the sleeve is assembled in place on the shaft in the bearing housing, the lip of the V-ring seats on an annular radially inwardly extending sealing surface on the housing externally of the labyrinth seal. The seal assembly disclosed in the '067 patent functions very effectively, but it may be difficult to properly assemble the various parts of the bearing seal disclosed in the '067 patent when the pillow block assembly is located in a place with difficult access. For example, in some situations, the lip of the V-ring seal may project into the housing joint between the upper and lower housing assemblies when the assembly is being placed in the pillow block. In such a situation, it would become pinched between the upper and lower housing thereby not operating effectively. In addition, in the '067 patent, the V-ring lip engages the housing face which has a joint gap between the cap and base.

SUMMARY OF THE INVENTION

It is a principle object of the present invention to provide a seal assembly which may be utilized in a housing opening without difficulty.

It is yet another object of the invention to provide a seal assembly which may be assembled prior to its application to the shaft or its support in the bearing housing.

It is still another object of the invention to provide a simplified labyrinth seal assembly which may readily be assembled outside of its use environment and easily dropped into place within a bearing housing opening.

It is another object of the present invention to provide an effective improved seal assembly that allows for easy assembly in confined areas.

The present invention comprises a labyrinth seal assembly for a bearing housing opening having stationary surfaces for supporting the seal assembly. The seal assembly includes a base sleeve which is adapted to fit onto the outer circumference of the shaft supported in the bearings and has a plurality of outwardly extending spaced annular ribs disposed on the outer circumference of the sleeve for interengaging inwardly extending spaced ribs on the upper and lower bearing support housing opening to form a labyrinth seal therewith. A flexible seal is disposed on the outer circumference of the sleeve between two of the spaced ribs on the sleeve. The flexible seal has an outwardly extending rib and a sealing lip extending outwardly at an angle to the base of the sleeve. A disc washer is disposed about the sleeve, between the sealing lip and the side of one of the other spaced ribs on the sleeve and has an inner diameter which is greater than the outer diameter of the sleeve and which is lesser than the outer diameter of the sealing lip. The disc washer includes a metallic inner section for cooperating with the sealing lip to form a sealing engagement and an outer compressive lip section which is adapted to fit within a groove in the bearing housing when the bearing is assembled to prevent the flexible seal from being pinched between the upper and lower housing assemblies and to prevent relative movement between the housing and the washer.

With this arrangement the shaft is capable of sliding axially relative to the sleeve during the operation of the bearing to permit expansion of the shaft while still maintaining the proper operating relationship between the various parts of the drop in seal assembly on the shaft and in the bearing housing opening. Any vapors or lubricant passing through the labyrinth seal can pass freely from the seal and the lip of the flexible seal, which is preferably a V-ring, is sufficiently flexible to permit these materials to pass outwardly along the radial sealing surface and then to reseal with the radial surface to prevent the ingress of moisture and dirt through the seal into the bearing.

BRIEF DESCRIPTION OF THE DRAWINGS

While a number of objects and advantages of the present drop in seal assembly have been set forth hereinbefore, other advantages will become apparent from the following description and the accompanying drawings, wherein.

DETAILED DESCRIPTION OF THE INVENTION

Figure 1:
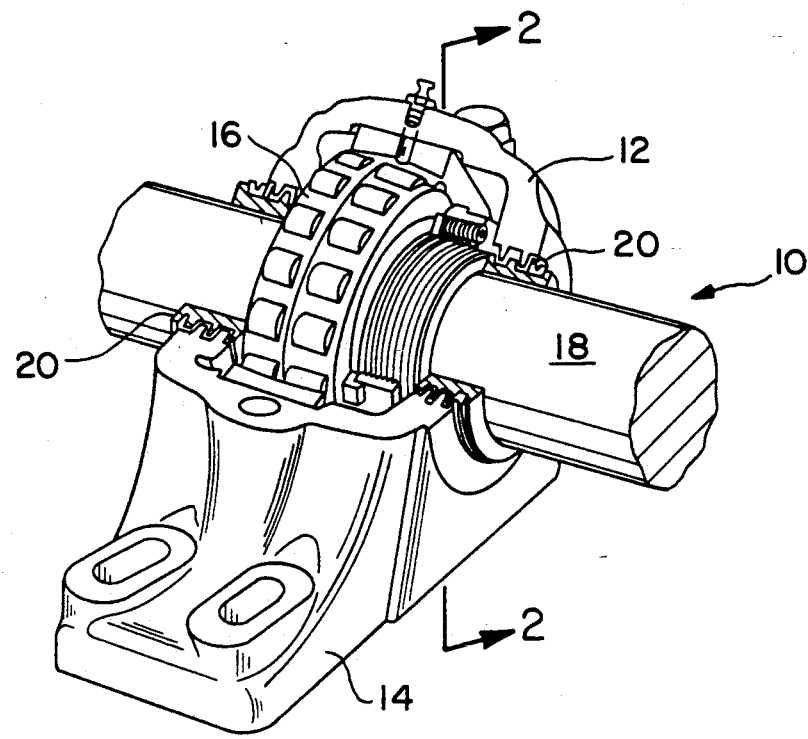
FIG. 1 is a perspective view of a pillow block bearing housing and a shaft, with a portion of the housing of the pillow block being broken away to show more effectively the seal assembly of the present invention between the shaft and the housing.
Figure 2:
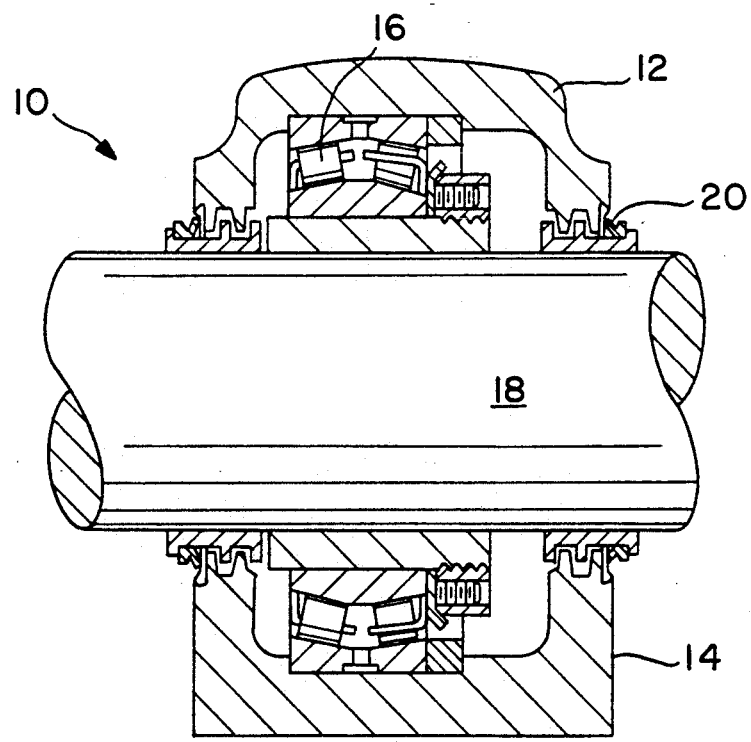
FIG. 2 is a vertical cross-sectional view of the pillow block illustrated in FIG. 1 and an elevational view of the shaft journaled therein, the section being taken along line 2—2 of FIG. 1.

Referring now to FIGS. 1 and 2 of the drawings which show a pillow block bearing assembly for mounting shafts for rotation therein. The pillow block assembly 10 comprises an upper housing cover 12 fitted onto a lower housing base 14 and surrounding a shaft 18 which extends through the pillow block and is supported with a plurality of bearings 16. At each side of the pillow block 10 an opening in the housing is fitted with a labyrinth seal assembly 20. As noted hereinabove, pillow blocks having labyrinth seals of this type are disclosed in U.S. Pat. No. 4,348,067.

The drop-in labyrinth seal assembly of the present invention utilizes a continuous disc washer wherein the disc is installed on the seal sleeve so that the lip of the flexible seal, which is preferably a V-ring seal, is supported by the disc. The seal assembly is then lowered into the housing base where the disc engages an angular groove in the pillow block housing so that interaction between the angular groove in the housing and the lip on the outer circumference of the washer compresses the disc washer against the housing base. One of the surfaces of the disc washer now provides the sealing surface and prevents the V-ring lip from overlapping the housing joint and the upper housing cover 12 can be mounted on the base 14 without danger of pinching the V-ring lips. The interaction between angular groove in the pillow block housing and the lip on the disc washer also compresses the disc washer against the housing face and locks the disc washer in place.

Figure 3:
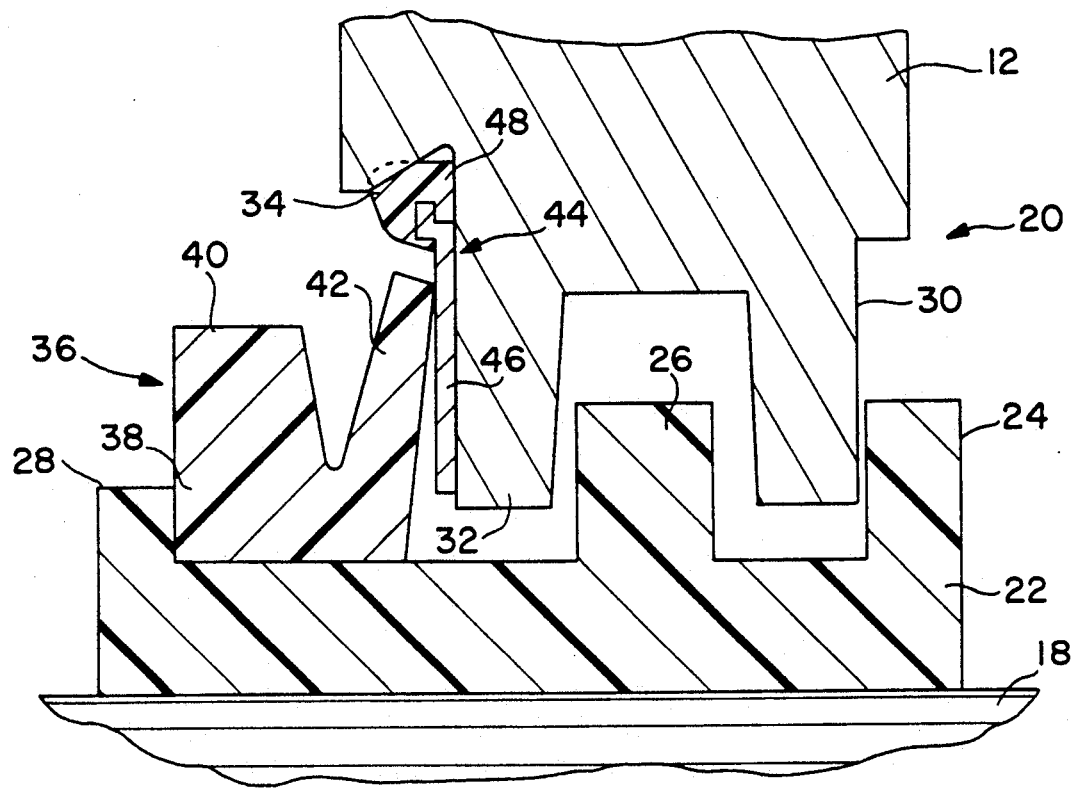
FIG. 3 is an enlarged cross-sectional view of one of the drop in seal assemblies of the invention used in the pillow block illustrated in FIGS. 1 and 2.

Referring now to FIG. 3 of the drawings wherein a portion of one of the seal assemblies is shown greatly enlarged. All of the other seal assemblies for this embodiment of the invention are identical and will not be described in detail.

Seal assembly 20 comprises a sleeve 22 which fits about the shaft 18 when the shaft is in its proper position. Sleeve 22 has a first annular sleeve rib 24, a second annular sleeve rib 26, and a third annular sleeve rib 28 which extend outwardly from the base of the sleeve to form a portion of the labyrinth seal. The bearing housing of the pillow block bearing 10 has a stationary structure which comprises inwardly extending annular housing rib 30 and inwardly extending annular housing rib 32 which extend between ribs 24 and 26 in the case of rib 30 and between ribs 26 and 28 in the case of rib 32 to form a labyrinth path for lubricant contained within the pillow block. Disposed between rib 32 and rib 28 is a flexible seal, which is preferably a V-ring seal, similar to that illustrated in the above-identified '067 patent. This V-ring seal has a base 38, an inwardly extending annular rib 40, and an annular sealing lip 42 which extends inwardly at an angle from the bottom surface of the V-ring seal so that it presses against rib 32 during usage. Preferably, the angle between the sealing lip 42 and annular rib 40 is less than 90°.

Located on sleeve 22 between V-ring seal 36 and rib 26 is a disc washer 44. When the sleeve is assembled in the pillow block, disc washer 44 is interposed between lip 42 and rib 32. Disc washer 44 has an outer diameter which is greater than the outer diameter of the V-ring seal and an inner diameter which is less than the inner diameter of lip 42 and greater than the inner diameter of rib 32. Disc washer 44 has an inner metallic or steel portion 46 which is pressed against the side of rib 32 by lip 42 when assembled. When assembled and in use, lip 42 moves relative to metallic portion 46 and establishes a sealing engagement therewith which prevents the passage of dirt, moisture and the like into the bearing housing structure. Disc washer 44 has an outer rubber lip section 48 which is integral with disc portion 46. When assembled in the pillow block housing, lip section 48 is tightly compressed into angled groove 34 which extends the entire diameter of the pillow block housing at the opening thereof as can be seen more clearly in FIGS. 5 and 6 which will be described in more detail hereinafter. The angle of groove 34 causes the disc washer 44 to be tightly maintained in place.

Figure 4:
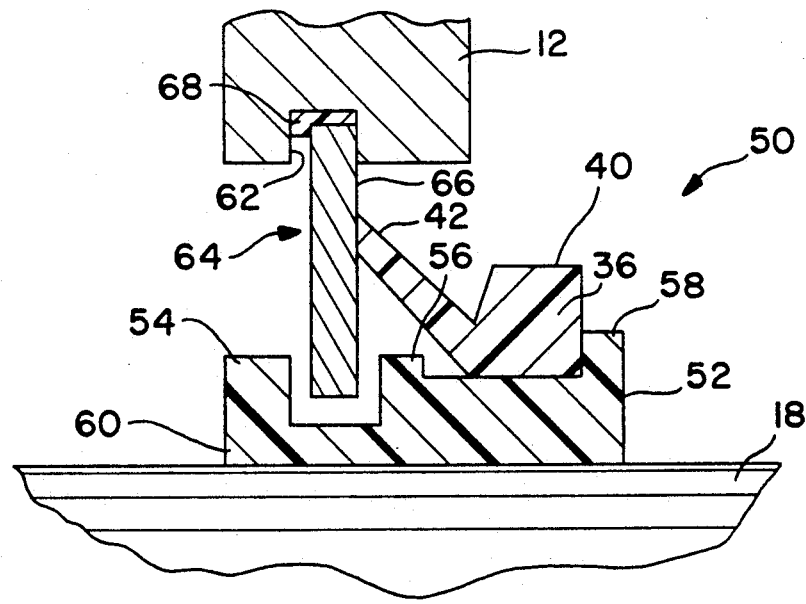
FIG. 4 is an enlarged cross-sectional view of an alternative embodiment of a drop in seal assembly used in the pillow block illustrated in FIGS. 1 and 2, similar to that shown in FIG. 3.

Referring now to FIG. 4 of the drawings an alternative embodiment of the labyrinth seal assembly of the invention is illustrated. In this embodiment, both the upper housing assembly 12 and t he lower housing base 14 are provided with an annular groove 62 into which is fitted a drop in disc washer 64. Disc washer 64 comprises a metallic portion 66 and a compression lip portion 68. Portion 66 of the disc washer extends inwardly to a position between two outwardly extending annular ribs 54 and 56 of sleeve 52 which is supported by base member 60 on shaft 18. In this embodiment, the interengagement between portion 66 and ribs 54 and 56 provides the labyrinth flow pattern which prevents outside contaminants from entering into the bearing chamber while still permitting the grease and gases to flow outwardly of the bearing to provide an effective seal. In this embodiment, a V-ring seal 36 having an inwardly extending annular rib 40 and a sealing lip 42 is positioned about the outer diameter of the base portion of sleeve 52 and lip portion 42 extends against the metallic portion of washer 64. Washer 64 remains stationary while lip portion 42 moves relative to the metallic portion of the washer when said shaft rotates relative to its bearing housing.

Figure 5:
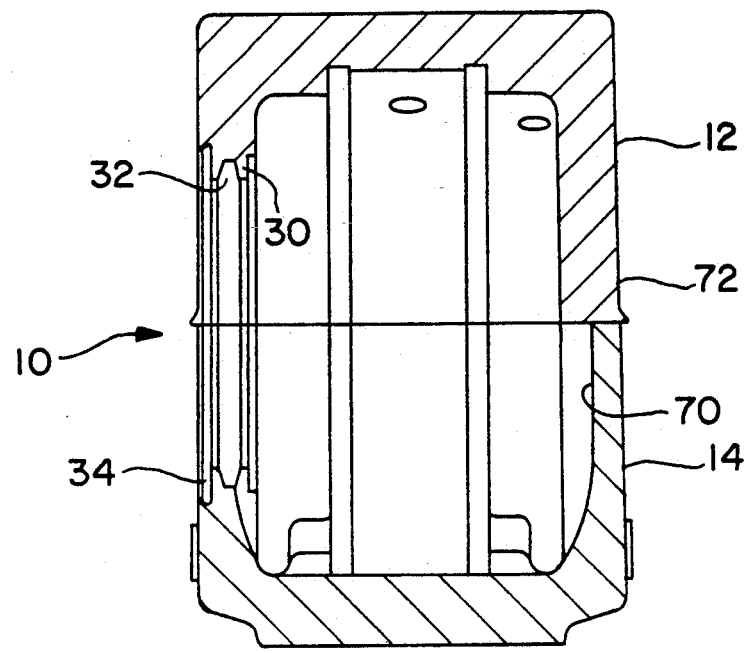
FIG. 5 is a vertical cross-sectional view of a closed end pillow block housing.

Referring to FIG. 5 of the drawings, a vertical cross-section of a closed end pillow block housing is illustrated. As can be seen in FIG. 5, housing 10 comprises an upper housing cover 12 and a lower housing base 14. In this embodiment of the invention, the shaft does not extend through the pillow block and, therefore, there is no seal assembly on the closed side of the pillow block. As illustrated in FIG. 5, pillow block cover 12 and housing base 14 are provided with a disc washer receiving groove 34 in the housing. Groove 34 extends about the inner circumference of both the pillow block cover 12 and the housing base 14 and is adapted to receive the disc washer 44 as described in detail with respect to FIGS. 1-3. Furthermore, housing rib 30 and housing rib 32 extend throughout the circumference of the shaft opening through both the cover and the base of the housing for receiving the labyrinth seal assembly of the invention. In FIG. 5, the shaft and bearing assembly have been omitted for the sake of clarity.

Figure 6:
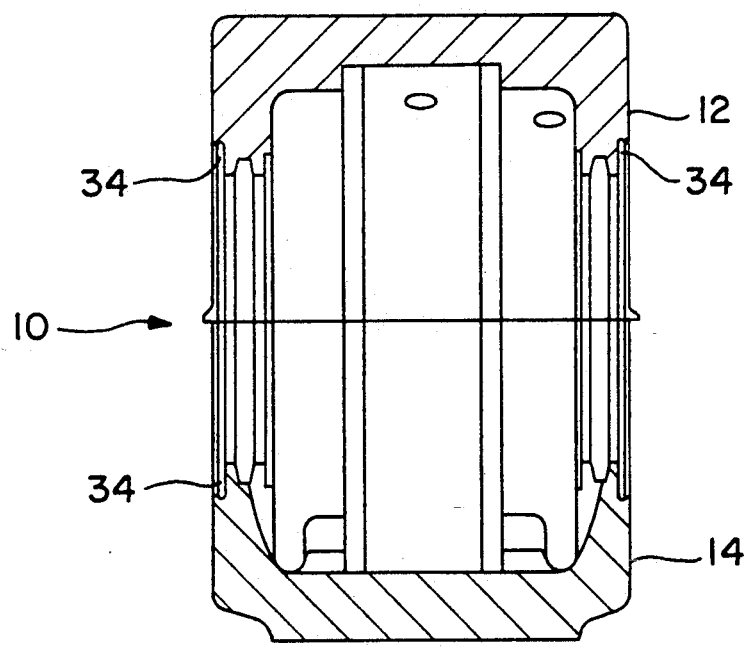
FIG. 6 is a vertical cross-sectional view of a pillow block for a through shaft having a seal assembly of the invention at openings at each side of the housing.

FIG. 6 illustrates a bearing housing 10 which has an opening on each side to permit a through shaft to extend through the bearing housing. In this FIGURE, the bearing assembly and the shaft have been omitted for the sake of clarity. Here, washer groove 34 extends about the opening on each side of the bearing housing for receiving a disc washer 44 when the shaft and the bearing assembly is enclosed within the housing. This permits the shaft to go through the bearing housing and to be supported by the pillow block bearings. FIG. 6 illustrates the embodiment of FIGS. 1-3.

Figure 7:
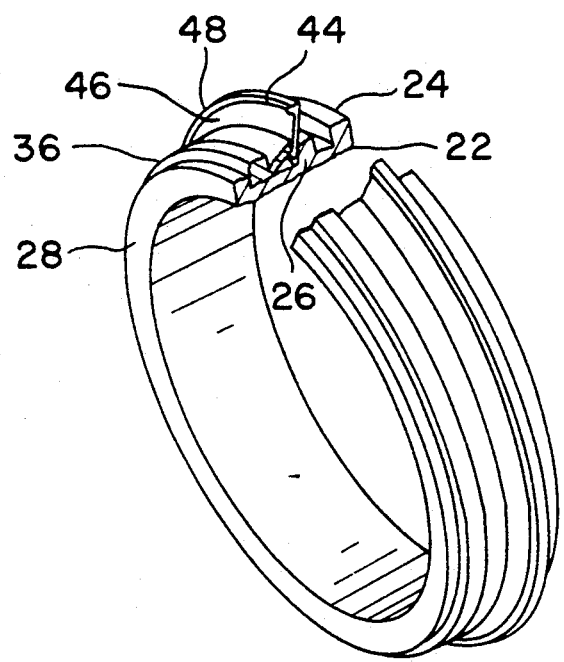
FIG. 7 is a perspective view of the drop in labyrinth seal assembly, constituting the preferred embodiment of the invention.

FIG. 7 is a perspective view of a preferred embodiment of the seal assembly in perspective as illustrated in FIGS. 1-3.

FIG. 7 illustrates in perspective the sleeve 22 with first annular sleeve rib 24, second annular sleeve rib 26 and third annular sleeve rib 28. FIG. 7 also illustrates V-ring seal 36 and disc washer 44 with metallic portion 46 and lip portion 48. The operation of these components has been described above with respect to FIGS. 1-3.

While the above embodiments of the invention have been described without reference to the materials forming the different components of the invention, it will be appreciated that it is desired that the V-ring seal be of a flexible material such as rubber or the like to give it the flexibility necessary to the invention. Furthermore, the sleeve of the drop in seal assembly may be formed of rubber which is substantially rigid or other flexible material as desired depending on the intended usage of the drop in seal assembly.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A seal assembly for a bearing housing shaft opening, said seal assembly comprising:
   (a) a base sleeve adapted to fit onto the outer circumference of a shaft supported by bearings in a bearing housing;
   (b) a plurality of outwardly extending spaced annular ribs disposed on the outer circumference of said base sleeve for interengaging inwardly extending spaced ribs on said bearing housing to form a labyrinth seal therewith in said shaft opening;
   (c) a flexible seal disposed on said outer circumference of said base sleeve between two of said spaced ribs on said sleeve and having an outwardly extending rib and a sealing lip which extends outwardly from the base of said sleeve at an angle; and
   (d) a disc washer disposed about said sleeve between said sealing lip and one of said spaced ribs on said housing, said disc washer having an inner diameter which is greater than the outer diameter of said sleeve and which is lesser than the outer diameter of said sealing lip.

2. A seal assembly as set forth in claim 1, wherein said housing includes an annular angled groove and said disc washer includes a metallic inner section for cooperating with said sealing lip and an outer lip section adapted to fit within said groove in said housing when said housing is assembled.

3. A seal assembly as set forth in claim 1, wherein the outer circumference of said sleeve has two outwardly extending spaced annular ribs for cooperating with said disc washer in said housing to form a labyrinth seal for grease in said bearings.

4. A seal assembly as set forth in claim 3, wherein said flexible seal is disposed between an outwardly extending rib on said sleeve and across an intermediate annular rib on said sleeve for sealing contact with said disc washer.

* * * * *